United States Patent [19]
Kato

[11] Patent Number: 5,574,526
[45] Date of Patent: Nov. 12, 1996

[54] LENS BARREL

[75] Inventor: Minoru Kato, Kawasaki, Japan

[73] Assignee: Nikon Corporation, Tokyo, Japan

[21] Appl. No.: 590,871

[22] Filed: Jan. 24, 1996

Related U.S. Application Data

[63] Continuation of Ser. No. 309,472, Sep. 22, 1994, abandoned, which is a continuation of Ser. No. 72,994, Jun. 7, 1993, abandoned.

[30] Foreign Application Priority Data

Jun. 12, 1992 [JP] Japan .................................. 4-177675

[51] Int. Cl.$^6$ .................................................... G03B 1/13
[52] U.S. Cl. .......................... 396/133; 396/85; 396/379
[58] Field of Search ........................... 354/195.1, 195.12, 354/400, 286, 187, 199

[56] References Cited

U.S. PATENT DOCUMENTS

| | | | |
|---|---|---|---|
| 4,416,526 | 11/1983 | Iomori et al. | 354/198 |
| 4,857,947 | 8/1989 | Wakabayashi et al. | 354/195.1 |
| 4,885,600 | 12/1989 | Iwasa et al. | 354/400 |
| 5,035,493 | 7/1991 | Tanaka | 350/429 |
| 5,144,493 | 9/1992 | Nomura | 359/700 |
| 5,144,494 | 9/1992 | Sekiguchi | 359/700 |
| 5,182,674 | 1/1993 | Notagashira et al. | 359/694 |
| 5,198,932 | 3/1993 | Takamura | 359/694 |

FOREIGN PATENT DOCUMENTS

| | | |
|---|---|---|
| 0344806 | 12/1989 | European Pat. Off. . |
| 2-10514 | 1/1990 | Japan . |
| 2229016 | 9/1990 | United Kingdom . |
| 2259997 | 3/1993 | United Kingdom . |

Primary Examiner—Howard B. Blankenship
Assistant Examiner—Nicholas J. Tuccillo

[57] ABSTRACT

A lens barrel of a camera has a stationary cylinder and a rotary cylinder which is advanced and retracted relative to the stationary cylinder while it is rotated.

A plurality of helical gears as well as a helicoid are formed, along the helicoid, on an outer periphery of the rotary cylinder which is helicoid-coupled to the stationary cylinder and advanced and retracted along the optical axis while it is rotated. A plurality of drive gears which are gear-coupled to the helical gears are formed on the stationary cylinder. At least one of the plurality of drive gears is gear-coupled to the helical gears in a rotation range of the rotary cylinder.

10 Claims, 6 Drawing Sheets

5,574,526

LENS BARREL

This application is a continuation of application Ser. No. 08/309,472, filed Sep. 22, 1994, now abandoned, which is a continuation of application Ser. No. 08/072,994, filed Jun. 7, 1993, now abandoned.

BACKGROUND OF THE INVENTION

1. Field of the Invention

The present invention relates to a lens barrel suitable for use in driving in and out in a sink barrel type camera, zoom-driving a photographing lens system in a zooming camera or focus-driving a photographing lens system in an AF camera.

2. Related Background Art

In a recent compact camera, a sink barrel type in which a lens barrel is driven into a camera body is adopted to meet a requirement of compactness and thinness.

In a lens barrel of such a sink barrel type camera, a rotating drive force from a drive source such as an electric motor is transmitted by a drive gear to a rotary cylinder which is rotatably held by a helicoid coupling in a stationary cylinder on a camera body, and the rotary cylinder is driven out along an optical axis while it is rotated so that the lens barrel is projected from the front surface of the camera body to be ready for photographing, and the rotary cylinder is reversely rotated to drive it into the camera body.

In a recent camera, as a part of multi-functioning of the camera, a zoom lens which permits photographing from telescopic range to wide angle range has been used.

In a lens barrel of such a zooming camera, the rotary cylinder is moved back and fourth along the optical axis while it is rotated as it is in the sink barrel type, and a focal distance of the photographing lens held and arranged in the lens barrel in the rotary cylinder is varied in accordance with the drive distance so that the photographing at a desired magnification is attained.

Recently, a combination of the zoom lens and the sink barrel type has been adopted. In such a combination of the zoom lens and the sink barrel type, it is required to increase the rotation angle and the drive distance of the rotary cylinder in the lens barrel and the drive distance of the lens barrel.

Further, auto-focusing (AF) which automatically focuses the lens has been widely adopted. In this case, again, the rotation and the drive of the rotary cylinder in the lens barrel and the drive of the lens barrel are done under a predetermined condition by the transmission of the rotating drive force from an electric motor to focus the lens system.

In the sink barrel type, the zoom type and the AF type, a rotation transmission unit of a drive gear which imparts a rotating drive force from the electric motor to the rotary cylinder usually uses a construction as disclosed in Japanese Laid-Open Utility Model Application No. 2-10514, in which a helical gear is provided on an outer periphery of the rotary cylinder and a stationary cylinder or a drive gear provided on a camera body is meshed therewith, and both cylinders are helicoid-coupled while the rotary cylinder is rotatably driven in the stationary cylinder so that the rotary cylinder is driven out and in along the optical axis.

However, in the prior art construction described above, in order to increase the drive stroke of the rotary cylinder, it is necessary to form the helical gear in a certain range along the optical axis on the outer periphery of the rotary cylinder because there is only one drive gear on the stationary cylinder. In addition, since the rotary cylinder is gradually driven out of the lens barrel so that an end thereof is exposed externally to form an externally viewable part, it is necessary to form an externally viewable part in addition to the gear formation part.

Accordingly, the larger the drive stroke is, the longer is the length of the rotary cylinder along the optical axis. This leads to the increase of the size of the lens barrel and hence the entire camera.

SUMMARY OF THE INVENTION

It is an object of the present invention to provide a lens barrel which prevents the increase of the size of the rotary cylinder and the lens barrel to attain a compact camera by improving a transmission unit between the rotary cylinder which is driven along the optical axis while it is rotated to drive in and out the photographing lens system and the drive unit for rotatably driving the rotary barrel.

In order to meet the above requirement, in the lens barrel of the present invention, a helical gear is formed at a portion of an outer periphery of the rotary cylinder which is helicoid-coupled to the stationary cylinder and driven in and out while it is rotated, and a plurality of drive gears which are gear-coupled to the helical gear are formed on the stationary cylinder so that at least one of the plurality of drive gears is gear-coupled with the helical gear in a rotation range of the rotary cylinder and only one of the drive gears is gear-coupled to the helical gear in at least one range in the rotation range.

The lens barrel of the present invention comprises a rotary cylinder having a second helicoid on an inner periphery thereof, the second helicoid being helicoid-coupled to a first helicoid on an outer periphery of the lens cylinder for holding a photographing lens system, the second helicoid being rotatably arranged externally of the lens cylinder and having a third helicoid on an outer periphery thereof; a stationary cylinder having a fourth helicoid coupled to a third helicoid and rotatably holding the rotary cylinder; a key ring having a first straight drive key engaged with a portion of the lens cylinder to guide the lens cylinder only along an optical axis and rotatably held by the rotary cylinder; and a second straight drive key engaged with a portion of the key ring and formed on the stationary cylinder to movably hold the key ring only along the optical axis. A helical gear is formed on the outer periphery of the rotary cylinder along the third helicoid and a plurality of drive gears gear-coupled to the helical gear are formed on the stationary cylinder. At least one of the plurality of drive gears is gear-coupled to the helical gear in a rotation range of the rotary gear, and only one of the drive gears is gear-coupled to the helical gear in at least one range in the rotation range.

In accordance with the present invention, the rotary cylinder is gradually driven in and out while it is rotated by the transmission of rotation from the gear of the drive gears which is gear-coupled to the helical gear of the rotary cylinder, and when the gear-coupled drive gear reaches the end of the helical gear as the rotary cylinder is rotated, another drive gear is gear-coupled to the helical gear so that the gear-coupled gears are sequentially relayed to share the entire drive stroke of the rotary cylinder. As a result, the range of formation of the gears on the rotary cylinder can be narrowed.

DETAILED DESCRIPTION OF THE PREFERRED EMBODIMENTS

FIGS. 1 to 6 show one embodiment of the lens barrel of the present invention. In the present embodiment, the lens barrel is a zoom lens in a sink barrel type camera.

Figure 1:
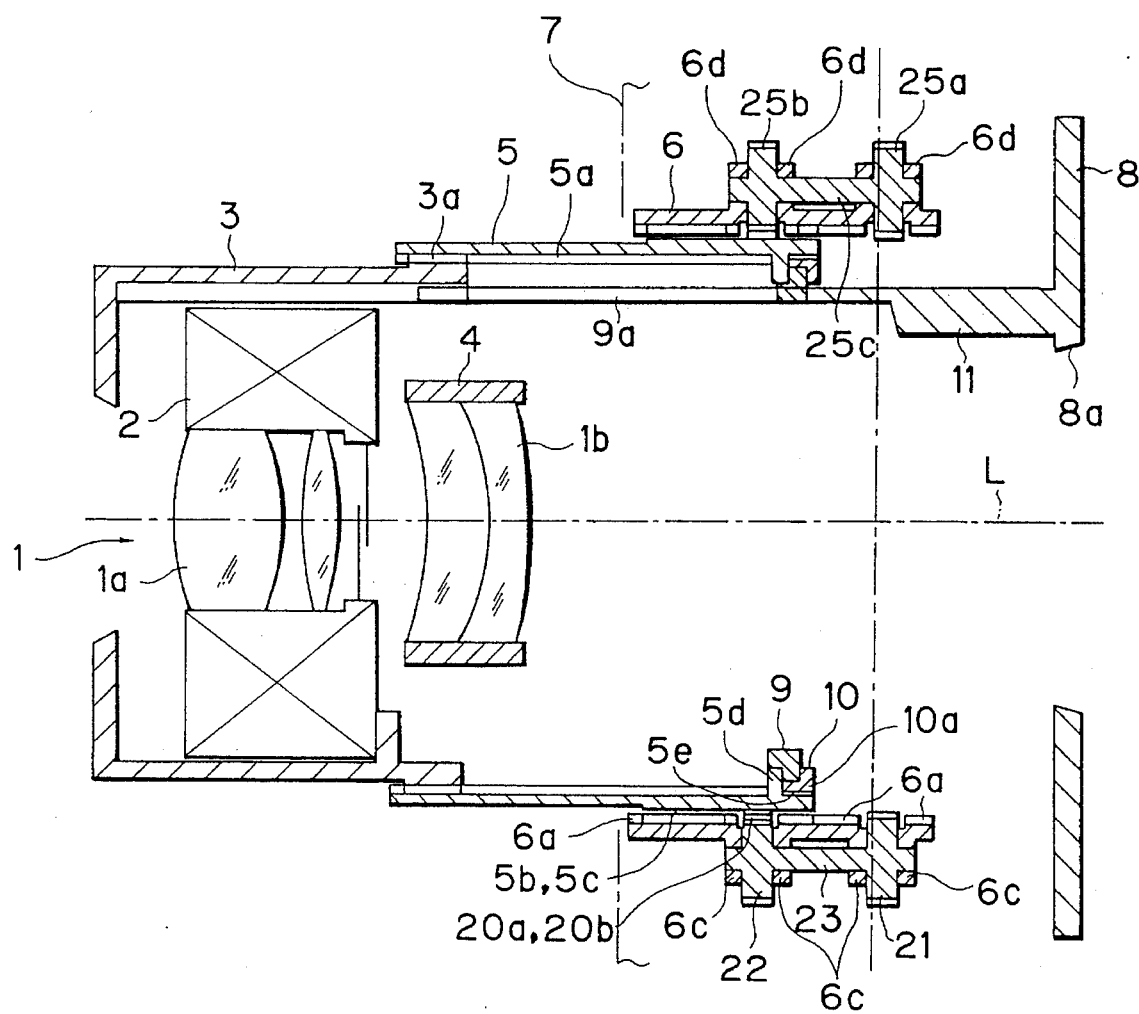
FIG. 1 shows one embodiment of a lens barrel of the present invention and it shows a sectional view of a main portion in a driven-out position of the lens barrel.
Figure 2:
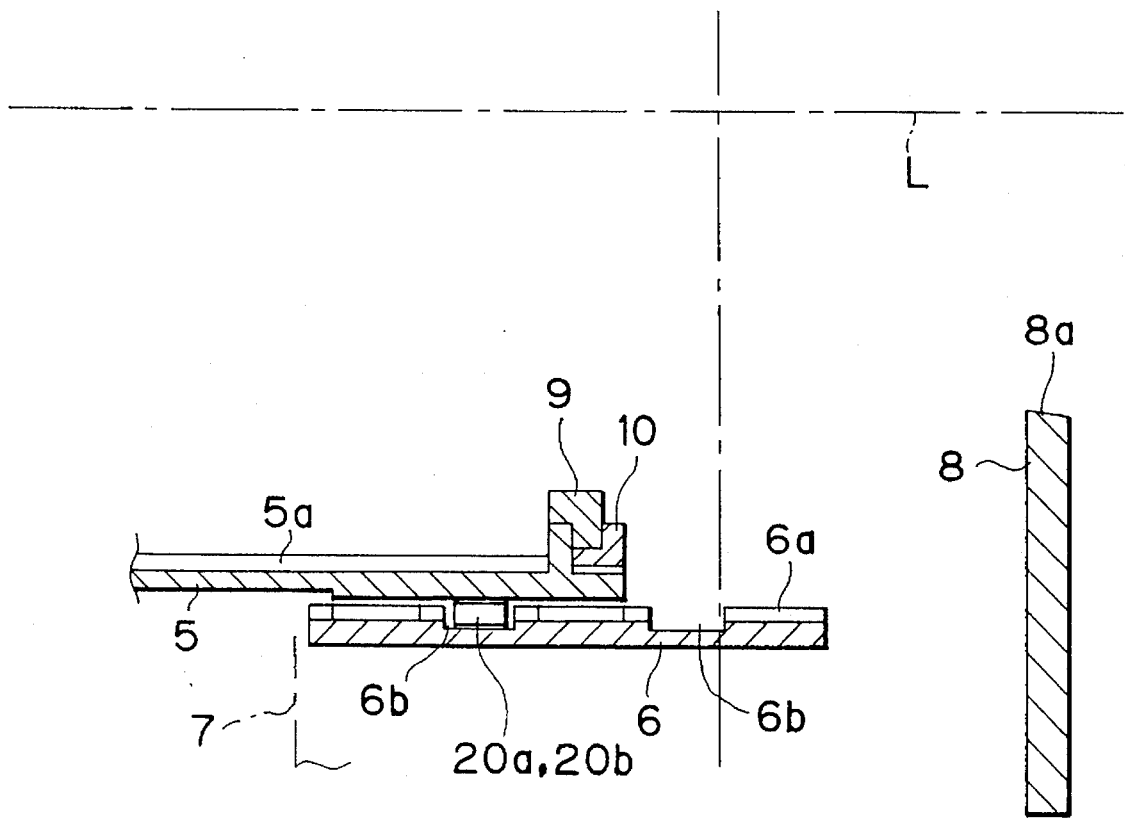
FIG. 2 shows a sectional view of a main portion in which a stationary cylinder in FIG. 1 is sectioned at a position where no gear is provided.
Figure 3:
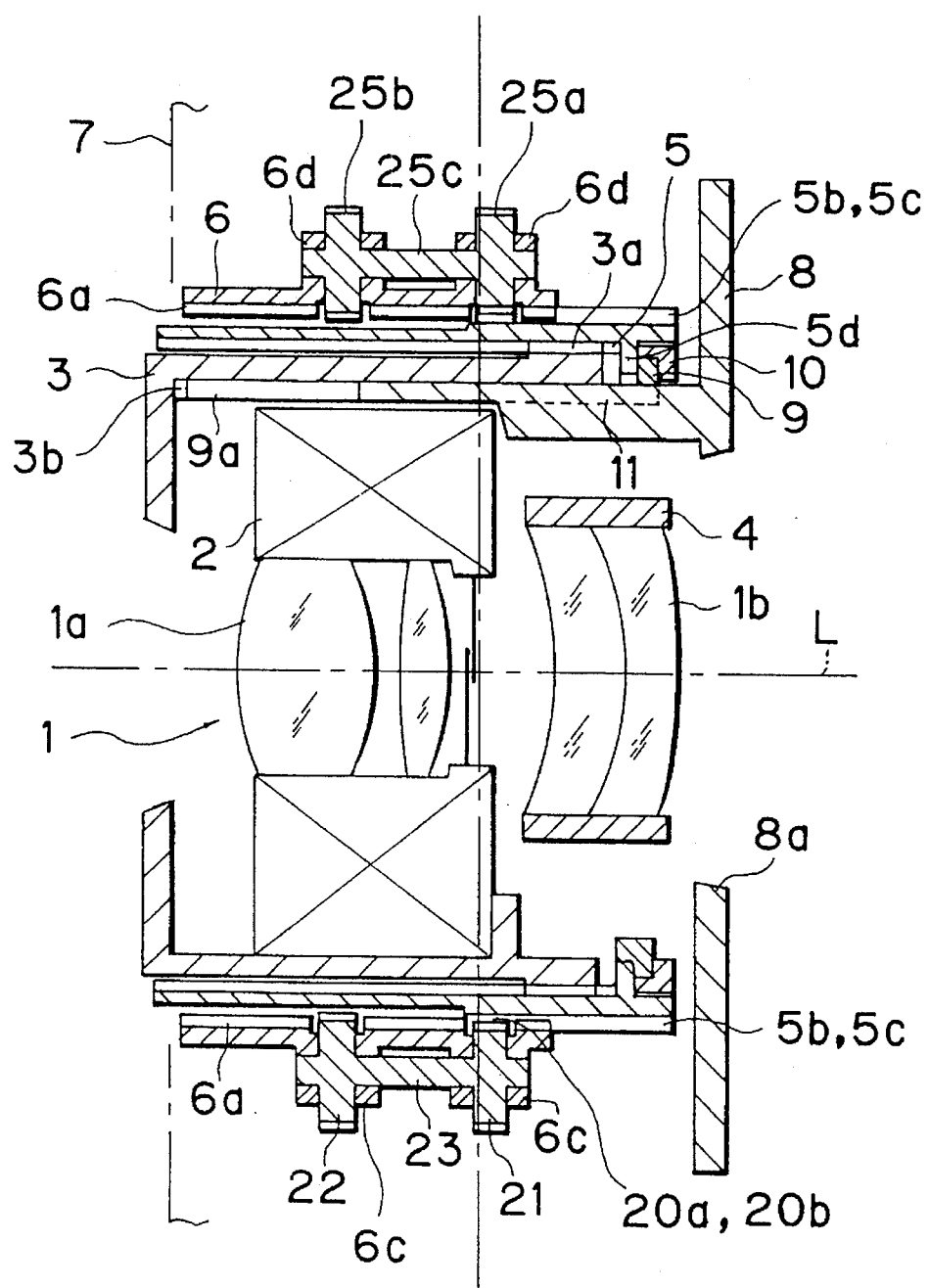
FIG. 3 shows a sectional view in a driven-in position of the lens barrel in FIG. 1.

In FIGS. 1 to 3, numeral 1 denotes a photographing lens system which comprises a first group of lenses 1a and a second group of lenses 1b and which forms a zoom lens system. A lens shutter mechanism 2 is arranged around the first group of lenses 1a and it is fixedly held in the lens cylinder 3. Numeral 4 denotes a lens cylinder which holds the second group of lenses 1b and it is advanced and retracted by a drive mechanism, not shown, along an optical axis L relative to the shutter mechanism 2 and the first group of lenses 1a held thereby.

A first helicoid 3a is provided at a portion of the outer periphery of the lens cylinder 3 and it is helicoid-coupled to a second helicoid 5a provided on the inner periphery of the rotary cylinder 5 as a double helicoid cylinder fitted to and arranged around the lens cylinder 3.

Figure 4:
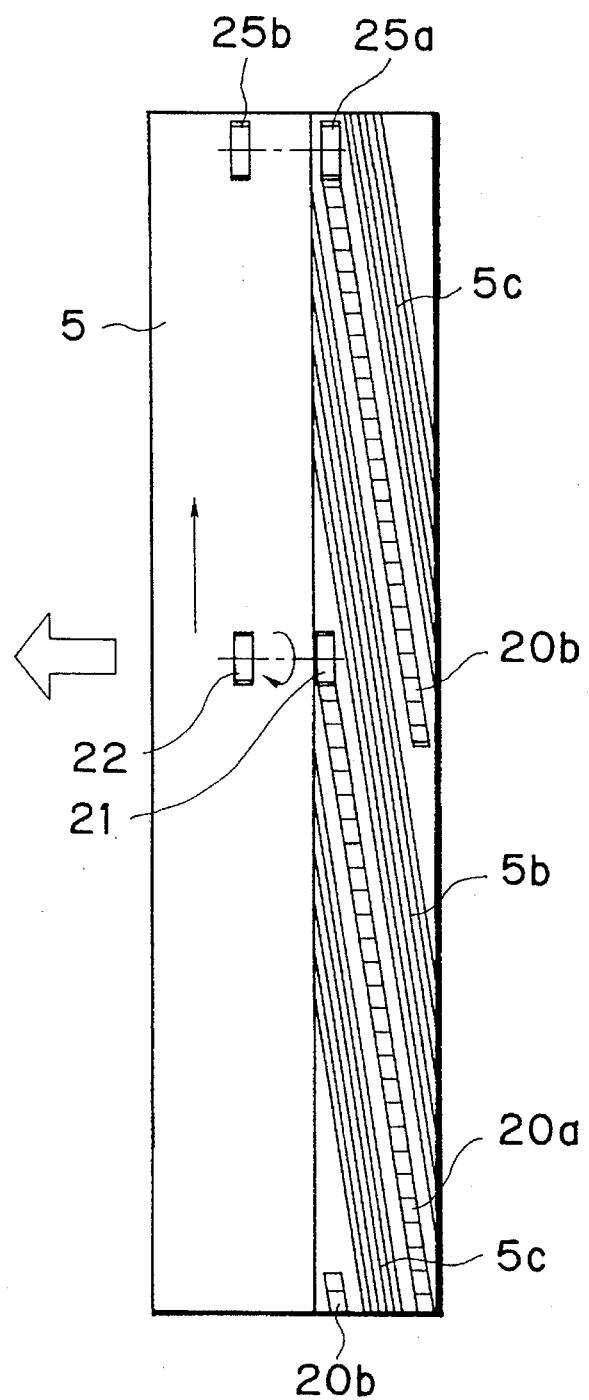
FIG. 4 shows a developed view of the rotary cylinder illustrating a relation with the drive gears.

As seen from FIGS. 1 and 4, third helicoids 5b and 5c are provided at two points on the outer periphery of the rotary cylinder 5, and helical gears 20a and 20b to be described hereinlater are formed along the third helicoids 5b and 5c. FIG. 4 et seq show the development of the outer periphery of the rotary cylinder 5.

Numeral 6 denotes a stationary cylinder which serves as a dark box and which is arranged to encircle the lens barrel in a camera body 7. The third helicoids 5b and 5c of the rotary cylinder 5 are helicoid-coupled to a fourth helicoid 6a formed on the entire inner periphery of the stationary cylinder so that the rotary cylinder 5 is driven in and out along the optical axis while it is rotated.

A film transport path, not shown, is formed on a back side of a member 8 which is arranged on a back side of the camera body 7 to form an aperture 8a.

Numeral 9 denotes a key ring rotatably built in and held on an inner periphery at a rear portion of the rotary cylinder 5. A first key 9a which extends forward of the camera from a portion of the key ring 9 engages with a key groove 3b formed at a portion of the inner periphery of the lens cylinder 3 so that the lens cylinder 3 and the key ring 9 are driven in union in the rotation direction and the lens cylinder 3 can freely advance and retract along the optical axis relative to the key ring 9. Numeral 5d denotes a flange provided at a rear end on the inner periphery of the rotary cylinder, and numeral 5e denotes a thread formed at a rear end of the flange 5d. An inner periphery thread 10a of a retainer ring 10 is threadedly coupled to the thread 5e to hold the key ring 9 rotatably between the retainer ring 10 and the flange 5d.

Numeral 11 denotes a second key extending forward of the camera from the member 8. The second key 11 engages with an engagement groove, not shown, formed at portions of the key ring 9 and the first key 9a to hold the key ring 9 movably only along the optical axis. Accordingly, by the action of the second key 11 and the first key 9a, the lens cylinder 3 can also be driven only along the optical axis through the key ring 9.

In accordance with the present invention, in the lens barrel constructed in the manner described above, helical gears 20a and 20b are formed along the third helicoids 5b and 5c at a portion of the outer periphery of the rotary cylinder 5 which is helicoid-coupled to the stationary cylinder 6 and advanced and retracted along the optical axis, and a plurality of (two in the present embodiment) drive gears 21 and 22 which are gear-coupled to the helical gears 20a and 20b are provided on the stationary cylinder 6 coaxially and in phase. At least one of the drive gears 21 and 22 is gear-coupled to the helical gears 20a and 20b in the rotation range of the rotary cylinder 5.

Figure 5:
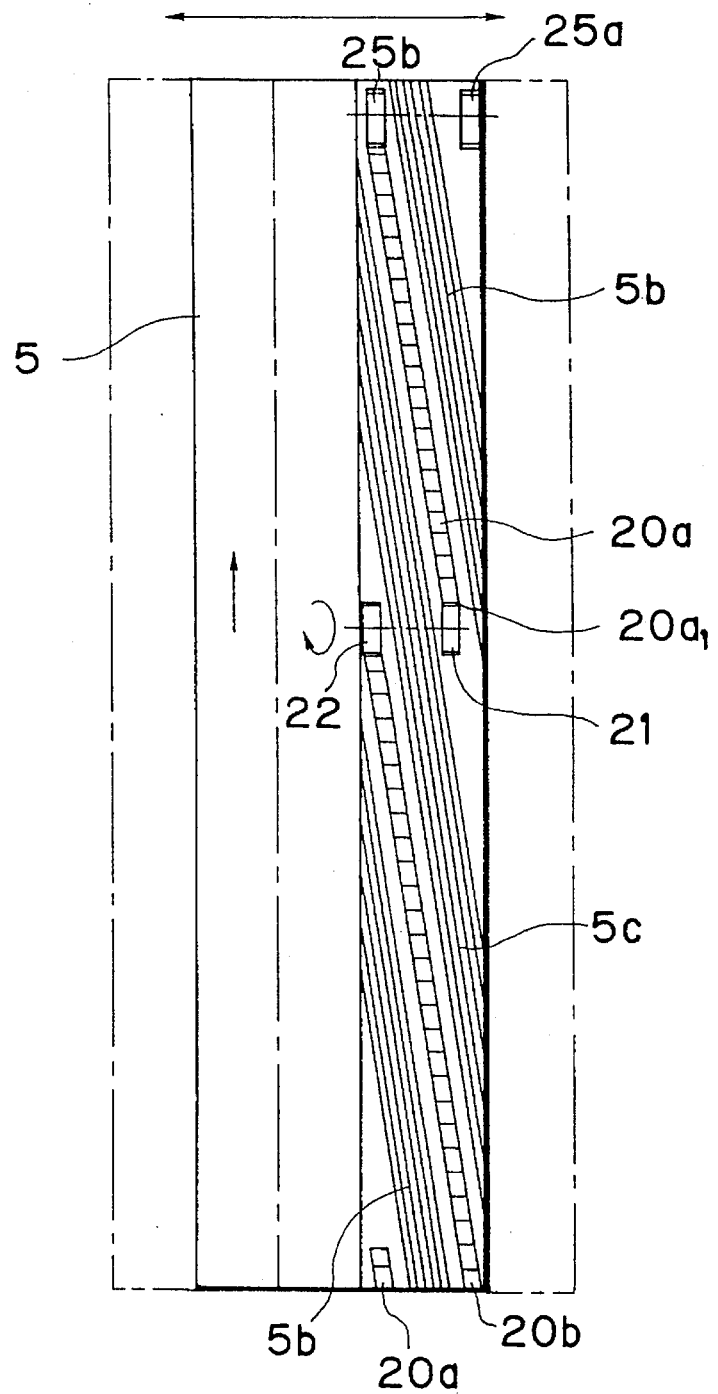
FIG. 5 shows a driven-out position of the rotary cylinder from the position of FIG. 4.
Figure 6:
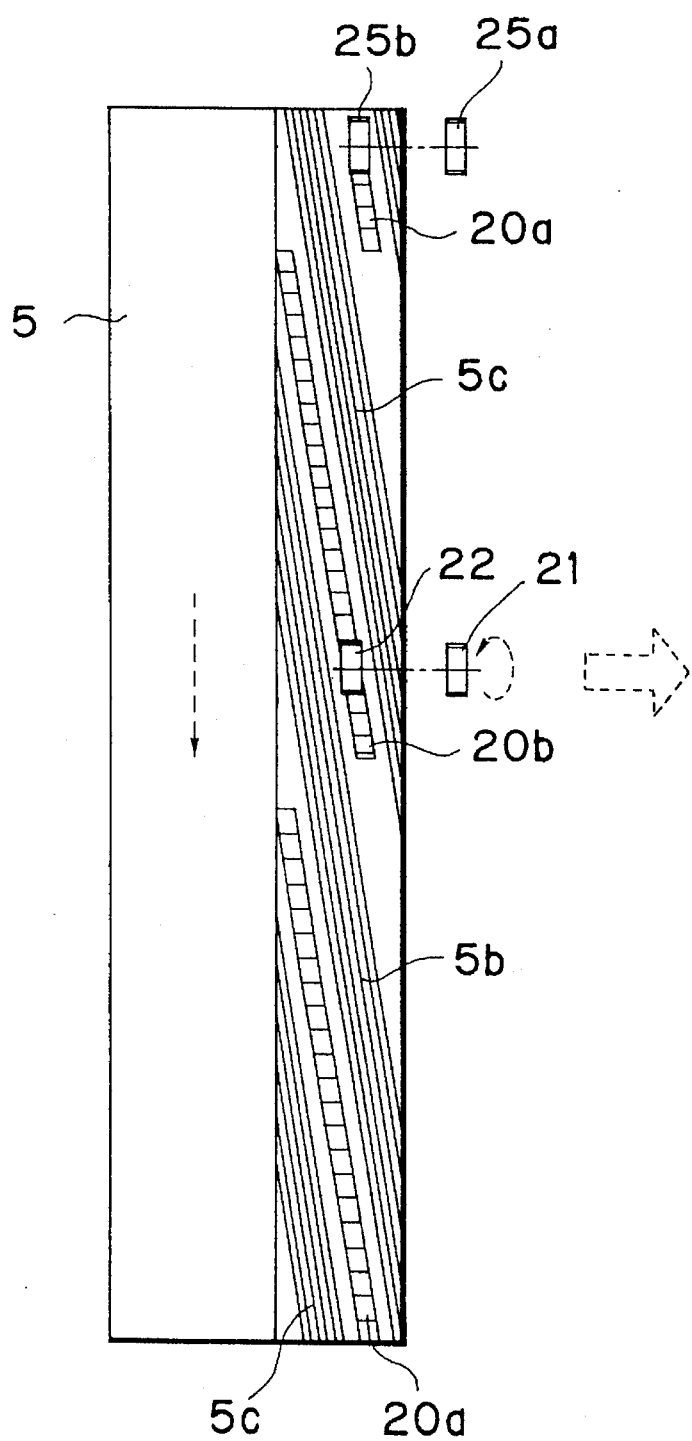
FIG. 6 shows an operation condition in connection with FIGS. 4 and 5.

As seen from FIGS. 4 to 6, the helical gears 20a and 20b are formed at two points between the third helicoids 5b and 5c at the rear end of the outer periphery of the rotary cylinder 5. On the other hand, plays 6b are formed at two points (see FIG. 2) in a formation area of the fourth helicoid 6a on the inner periphery of the stationary cylinder 6 to prevent interference with the helical gears 20a and 20b on the rotary cylinder 5.

A support 6c is formed at a portion of the periphery of the stationary cylinder 6, and a support shaft 23 for integrally coupling the two drive gears 21 and 22 is rotatably supported by the support 6c. Thus, the drive gears 21 and 22 are held coaxially and in phase. While the drive gears 21 and 22 are held coaxially and in phase in the present embodiment, they may be in different axes and different phases. Drive gear chains, not shown, are gear-coupled to the drive gears 21 and 22 to receive the transmission of the rotation from a drive source such as an electric motor.

In FIG. 1, numerals 25a and 25b denote finder gears which are supported by a support 6d provided on the outer periphery of the stationary cylinder 6 at a different position from the drive gears 21 and 22 (at the facing position in the present embodiment). The finder gears 25a and 25b are also integrally coupled to the support shaft 25c and rotatable coaxially and in phase. The finder gears 25a and 25b take out the rotation of the rotary cylinder 5 on the lens barrel by selectively being meshed with the gears 20a and 20b and transmit the rotation to a variable finder magnification gear, not shown.

In the present embodiment, the rotary cylinder 5 is gradually driven in and out along the optical axis while it is rotated by the transmission of the rotation from the gear 21 of the drive gears 21 and 22 which is gear-coupled to the helical gears 20a and 20b of the rotary cylinder 5, and when the drive gear 21 which is gear-coupled reaches the end of the helical gear 21a as the rotary cylinder 5 is rotated, the other drive gear 22 is gear-coupled to the other helical gear 20b. In this manner, the gear coupling is sequentially relayed and distributed over the entire drive stroke of the rotary cylinder 5. As a result, the range of formation of the gears 20a and 20b on the rotary cylinder 5 can be reduced compared to the prior art.

The above operation is now explained in conjunction with the driven-out position shown in FIG. 1 and the sink position shown in FIG. 3.

The lens cylinder 3 and the rotary cylinder 5 are advanced and retracted along the optical axis between the driven-out position (FIG. 1) and the sink position (FIG. 3). As the lens barrel is driven, the lens cylinder 4 which holds a second group of lenses 1b is advanced or retracted relative to a shutter mechanism 2 by a control unit, not shown, to conduct a required zooming operation.

FIG. 4 shows a positional relation on the cylinder 5 among the drive gears 21 and 22 and the finder gears 25a and 25b in the sink position shown in FIG. 3, FIG. 5 shows a positional relation in an interim position from the sink position to the driven-out position, and FIG. 6 shows a positional relation in the driven-out position shown in FIG. 1.

In the sink position shown in FIG. 4, the drive gear 21 is gear-coupled to a portion of the gear 20a. At this time, the drive gear 22 is at a position not to gear-couple to the gears 20a and 20b.

Similarly, the finder gear 25a is gear-coupled to the gear 20b while the finder gear 25b is at a position having nothing to do with the gears 20a and 20b and is not gear-coupled thereto.

In this position, it is assumed that the drive gears are rotated rightward (as viewed from the front) when the motor is driven by the control unit, not shown, and the rotating motive force is transmitted to the drive gears 21 and 22 through the drive gear chain. Then, the rotation of the drive gears 21 and 22 is transmitted from the gear 21 to the gear 20a to rotate the rotary cylinder 5 leftward (as viewed from the front).

As the rotary cylinder 5 is rotated leftward, the rotary cylinder 5 is driven out in the direction of the arrow shown in FIG. 4 while it is rotated by the helicoid coupling with the fourth helicoid 6a on the stationary cylinder 6.

As it is rotated under this condition, the drive gear 21 reaches an end 20a1 of the gear 20a as shown in FIG. 5 so that the gear coupling is broken. However, slightly before that, the gear 20b which has been being driven out while it is rotated starts the gear coupling to the drive gear 22 so that the operation is continued by the gear coupling of the gear 20b and the drive gear 22 even after the gear coupling of the gear 20a and the drive gear 21 has been broken.

The drive is continued by the transmission of the rotation from the drive gear 22 to the gear 20b and it is stopped in the driven-out position shown in FIG. 6.

In the interim position shown in FIG. 5, the right chain line shows the sink position and the left chain line shows the driven-out position. The movement of the rotary cylinder 5 by the rotational drive of the drive gears 21 and 22 will be readily understood.

On the other hand, when a start of sink command is issued from the control unit, the drive gears 21 and 22 are rotated leftward (as viewed from the front) and the lens barrel returns to the sink position of FIG. 4 from the position of FIG. 6 in the opposite route to that for the drive-out operation.

In the above series of operations, the finder gears 25a and 25b are also sequentially gear-coupled to the gears 20b and 20a and the finder gears 25a and 25b are rotated rightward (as viewed from the front) as the rotary cylinder 5 is rotated leftward (as viewed from the front) to drive the variable finder magnification gear, not shown, gear-coupled thereto to drive the variable magnification finder to a required position.

In this case, the gear coupling is relayed between the finder gears 25a and 25b and the gears 20b and 20a in the interim position to continue the rotation in the same manner as that for the drive gears 21 and 22, and the detail thereof is omitted here.

It should be readily understood that the present invention is not limited to the above embodiment and the shape and the structure of the parts of the lens barrel may be modified or changed as desired and various modifications may be made. For example, while the above embodiment uses the two helical gears 20a and 20b on the rotary cylinder 5 and rotatably drives the rotary cylinder 5 by coupling the two drive gears 21 and 22 by the support shaft 23, the present invention is not limited thereto but a plurality of gears may be formed on the rotary cylinder 5 and a plurality of drive gears which are selectively coupled thereto may be provided as required.

In the above embodiment, the finder gears 25a and 25b for driving the variable magnification finder are provided in parallel to the drive gears 21 and 22. This may be applied to a control encoder of the lens barrel.

The lens barrel of the present invention is not limited to the sink barrel type zoom lens of the embodiment but it may be equally applicable to a transmission unit of the rotary cylinder and the drive system which receives the transmission of the rotation from the drive gears to drive in and out the rotary cylinder in the lens barrel of the sink type, zoom type and the AF type.

In accordance with the lens barrel of the present invention, the helical gears are formed at a portion of the outer periphery of the rotary cylinder which is helicoid-coupled to the stationary cylinder and advanced and retracted along the optical axis while it is rotated, and a plurality of drive gears which are gear-coupled to the helical gears are provided on the stationary cylinder. At least one of the plurality of drive gears is gear-coupled to the helical gear in the rotation range of the rotary cylinder and only one of the drive gears is gear-coupled to the helical gear in-at least one range in the rotation range. Accordingly, the range of formation of the gears on the outer periphery of the rotary cylinder along the optical axis is minimized in spite of the simple structure so that the length along the optical axis of the rotary cylinder and the lens barrel arranged therein is shortened and a thin and compact camera is provided.

In accordance with the present invention, the range of formation and the angle of inclination of the helical gears on the rotary cylinder and the position of arrangement of the drive gears which selectively mesh with the helical gears and the pitch of the coaxial arrangement thereof are appropriately selected while taking the relation with the helicoids which couple both cylinders into account so that drive by a stable power transmission is attained while the drive stroke of the rotary cylinder along the optical axis is maintained at the required level and the reliability of the operation is improved.

What is claimed is:

1. A lens barrel device having a rotary cylinder helicoid-coupled to a stationary cylinder and movable along an optical axis while rotated, comprising:

a helical gear formed on an outer periphery of said rotary cylinder;

a plurality of drive gears and a plurality of driven gears arranged to be gear-coupled to said helical gear and arranged on said stationary cylinder;

at least one of said plurality of drive gears being gear-coupled to said helical gear in a rotation range of said rotary cylinder, and at least one of said driven gears being gear-coupled to said helical gear in a predetermined rotation range of said rotary cylinder, only one of said plurality of drive gears being gear-coupled to said helical gear in at least one range in said rotation range, and only one of said driven gears being gear-coupled to said helical gear in at least one range in said predetermined rotation range.

2. A lens barrel device according to claim 1, wherein said helical gear has at least two gear portions within a rotation range of said rotary cylinder.

3. A lens barrel device according to claim 1, wherein said plurality of drive gears is formed as a single unit in which said plurality of drive gears is rotatable as one body about a common rotary axis.

4. A lens barrel device according to claim 1, wherein said plurality of driven gears is formed as a single unit in which said plurality of driven gears is rotatable as one body about a common rotary axis.

5. A lens barrel device comprising:

- a lens cylinder for holding a photographing lens system and having a first helicoid on an outer periphery thereof;
- a rotary cylinder having a second helicoid helicoid-coupled to said first helicoid on an inner periphery thereof and rotatably arranged externally of said lens cylinder and having a third helicoid on an outer periphery thereof;
- a stationary cylinder having a fourth helicoid helicoid-coupled to said third helicoid and rotatably holding said rotary cylinder;
- a first guide member rotatably held by said rotary cylinder for engaging with a portion of said lens cylinder to guide said lens cylinder along an optical axis;
- a second guide member arranged on said stationary cylinder for engaging with said first guide member for holding said first guide member movably only along the optical axis;
- a helical gear formed along said third helicoid on the outer periphery of said rotary cylinder;
- a plurality of drive gears and a plurality of driven gears arranged to be gear-coupled to said helical gear and formed on said stationary cylinder;
- at least one of said plurality of drive gears being gear-coupled to said helical gear in a rotation range of said rotary cylinder and at least one of said plurality of driven gears being gear-coupled to said helical gear in a predetermined rotation range of said rotary cylinder, and
- only one of said plurality of drive gears being gear-coupled to said helical gear in at least one range in said rotation range, and only one of said plurality of driven gears being gear-coupled to said helical gear in at least one range of said predetermined rotation range.

6. A lens barrel device according to claim 5, wherein said plurality of driven gears includes a finder gear for driving a finder.

7. A lens barrel device according to claim 5, wherein said plurality of driven gears includes a finder gear for driving a magnification variable finder.

8. A lens barrel device according to claim 5, wherein said helical gear has at least two gear portions within a rotation range of said rotary cylinder.

9. A lens barrel device according to claim 5, wherein said plurality of drive gears is formed as a single unit in which said plurality of drive gears is rotatable as one body about a common rotary axis.

10. A lens barrel device according to claim 5, wherein said plurality of driven gears is formed as a single unit in which said plurality of driven gears is rotatable as one body about a common rotary axis.

* * * * *